United States Patent Office 3,835,065
Patented Sept. 10, 1974

3,835,065
PROCESS FOR THE PREPARATION OF CATALYSTS FOR THE POLYMERISATION AND COPOLYMERISATION OF ETHYLENE
Paolo Colombo, Saronno, and Marco Galliverti, Legnano, Italy, assignors to Societá Italiana Resine S.I.R. S.p.A., Milan, Italy
No Drawing. Filed Nov. 27, 1972, Ser. No. 309,848
Claims priority, application Italy, Dec. 27, 1971, 32,956/71
Int. Cl. C08f 1/42
U.S. Cl. 252—429 C    11 Claims

ABSTRACT OF THE DISCLOSURE

Ethylene polymerisation and copolymerisation catalysts comprise an organometallic compound and the product of a treatment of a sulphite of calcium, magnesium, manganese or zinc with a liquid halogen containing compound of a transition metal, the sulphite having been obtained by bubbling sulphur dioxide through a solution or suspension of an oxide, hydroxide or salt of the metal with subsequent slow elimination of excess of the sulphur dioxide before recovery and drying of the sulphite.

---

The present invention relates to a process for the preparation of catalysts suitable for the polymerisation and copolymerisation of olefins.

It is well-known that polymers and copolymers of olefins and particularly those of ethylene can be obtained by polymerising the monomers with catalysts of the Ziegler type.

Such catalysts are normally obtained by bringing compounds of the transition metals into contact with metals, hydrides or organo-metallic derivatives of the elements belonging to groups Ia, IIb and IIIb of the periodic system.

More recently, catalysts have been developed for the polymerisation and copolymerisation of olefins comprising an organo-metallic compound and the product of interaction between a halogenated compound of a transition metal in the liquid state and a solid support.

However, the use of such catalysts entails a number of problems in that the form and physical and chemico-physical characteristics of the supports used in the preparation of the catalysts themselves have a considerable effect on the progress of polymerisation.

In particular, there are various difficulties in obtaining supports of a regular crystalline structure and uniform and constant granulometric distribution. It is already known that the control of the crystalline structure and of the granulometric distribution of such supports is essential to the attainment of catalysts having uniform and reproducible characteristics and therefore to the attainment of polymeric products having defined and constant properties.

Thus, if there is a change in the crystalline structure and granulometric distribution of the supports, polymers having different properties will be obtained, for example the granulometry of the polymer itself, homogeneity of the properties of the polymer such as the molecular weight, the molecular distribution and weight, the percentage of branching and crystallinity.

Therefore, the use of a catalyst produced by a support of non-uniform characteristics and form makes it difficult on an industrial scale regularly to produce a polymer of defined and constant properties. There is therefore obvious importance in the support used in the catalyst described, particularly with regard to its nature, the method by which it is prepared and in any activation treatments. It has now been found possible to eliminate or at least substantially to reduce the disadvantages of the prior art relative to catalysts comprising an organometallic compound and the product of interaction between a halogenated compound of a transition metal in the liquid state and a granular solid support.

One object of the present invention therefore is a process for the manufacture of supported catalysts which are highly active in the polymerisation of ethylene and in the copolymerisation of ethylene with alpha-olefins.

Another object of the present invention is a process for the preparation of catalysts suitable for the production of polymers of ethylene and copolymers with alpha-olefins, which have defined and uniform characteristics.

A further object of the present invention is the process for the production of polymers of ethylene and copolymers of ethylene with alpha-olefins using the said catalysts.

Further objects of the invention will become apparent from the following description.

The catalysts according to the present invention comprise an organo-metallic compound and a product of interaction between a halogenated compound of a transition metal in the liquid state and a granular solid support, wherein the said support is obtained by activation at elevated temperature and in an inert atmosphere of sulphites of calcium, magnesium, manganese and zinc, the said sulphites being obtained by a particular precipitation in an aqueous ambient of the relative salts, oxides and hydroxides.

More particularly according to the process of the present invention, the initial process is the solution or suspension in water of the said oxides, hydroxides or salts of calcium, magnesium, manganese or zinc, the salts being of organic or inorganic acids with a pK of first acid dissociation in excess of 1.8, in a quantity greater than or at least equal to 5% by weight, and preferably 10 to 20 %by weight. Examples of salts which may be used are the acetates, formates, carbonates and inactive sulphites. Then, sulphur dioxide is bubbled through the suspension or solution in a quantity equal to or greater than 50% in excess of that stoichiometrically necessary to transform the salt, hydroxide or oxide of calcium, magnesium, manganese or zinc into the form of an acid sulphite.

During bubbling, the temperature is maintained within the range from room temperature up to 50–60° C.

After separation of any solid residues, the solution is ready for the subsequent sulphite precipitation stage.

For this purpose, the non-reacted sulphur dioxide is slowly eliminated, the pressure above the solution or suspension being gradually lowered to a pressure level corresponding to the vapour tension of the solution at the temperature at which the elimination takes place, over a period of not less than 1 hour and preferably not greater than 3 hours.

During elimination of the sulphur dioxide the temperature is preferably maintained at the levels of the bubbling phase of the sulphur dioxide in solution, while it is even more preferable to proceed with slow agitation.

The precipitate obtained, after separation for example by filtration or centrifugal treatment, is washed with a polar organic solvent, for example acetone or methanol, and then dried by treatment at a temperature of approximately 20° C. and at a pressure below atmospheric level, for a period of not less than 1 hour.

Thus, a hydrated sulphite is obtained with up to 6 molecules of crystallisation water, which is then subjected to activated treatment. For this purpose, the hydrated sulphite is subjected to the action of a flow of inert gas such as nitrogen, argon, carbon dioxide, the working temperatures being comprised in the range from 350 to 700° C. for a period of time ranging from 3 to 25 hours.

Even more satisfactory results are obtained when the temperature is allowed to rise from ambient level to a level in the range from 450 to 600° C. in a period of time not less than 2 hours and preferably 3 to 10 hours and if this temperature is maintained for a period of not less than 3 hours and preferably of 5 to 15 hours.

Outside of these values, undesired results are achieved for the supports, both with regard to insufficient activation and with regard to phenomena of sintering of the supports, which are therefore rendered virtually useless for interaction with the halogenated derivative of the transition metal.

The treatment described can easily be carried out in ovens, for example rotary electric ovens and fluid bed electric ovens provided with an apparatus for programing the rate of heating and for regulating the temperature. In this way, supports are obtained which have a regular crystalline structure and a uniform and constant granulometric distribution, normally ranging from 10 to 100 microns.

Such supports are particularly suitable for interaction with the halogenated transition compound in the liquid state in the preparation of catalysts of high activity and uniform and reproducible characteristics for the polymerisation of ethylene and for the copolymerisation of ethylene with alpha-olefins. The supports obtained can then be used according to the prior art techniques for the preparation of catalysts, comprising an organo-metallic compound and a product of interaction which is between a halogenated compound of a transition metal in the liquid state and a solid support, suitable for the polymerisation of ethylene and the copolymerisation of ethylene with alpha-olefins.

The liquid halogenated derivatives of the transition metals which are caused to react with the support are chosen from among the chlorides, bromides and oxyhalides of metals of groups IV–B and V–B of the periodic system and more particularly from among the chlorinated derivatives of titanium and vanadium, for example titanium tetrachloride and vanadium oxychloride.

The reaction is normally carried out in the absence of solvent, by impregnation of the support with the liquid halogenated transition derivative, at a temperature comprised between 50 and 160° C. in a period of not less than 30 minutes and preferably between 30 minutes and 2 hours, with relative quantities such that the solid support is comprised in the range from 5 to 25% by weight with respect to the halogenated liquid derivative.

The product obtained may undergo one or more washings with the same halogenated transition derivative in the liquid state in order to carry away any precipitated products, and then one or more washings with a hydrocarbon solvent in order to eliminate any traces of transition compounds which may be present.

The product which is in a dry solid state or in the form of a suspension is then brought into contact with an aluminium trialkyl or a zinc dialkyl or a dialkyl halide of aluminium, the alkyl groups comprising 1 to 4 carbon atoms.

The quantity of metallo-organic compound to be used is not critical so long as the compound is present in molar excess with respect to the transition metal fixed on the support, but it is preferable to work with molar ratios of metallo-organic compound to a fixed transition metal ranging from 20 to 100. This operation of bringing the media into contact with each other is normally carried out in the presence of an inert hydrocarbon which must remain liquid under the conditions of polymerisation at a temperature of between 40 and 100° C.

The catalytic system is used for the polymerisation and copolymerisation of olefins and in particular for the production of ethylene polymers and copolymers of ethylene with propylene, and of ethylene with 1-butene, in which the ethylene is present to the extent of at least 90%.

For this purpose, the monomer or monomers are introduced into the catalyst suspension in the form of gases or liquids at a pressure comprised between atmospheric pressure and 35 atmospheres, and at a temperature of 40 to 100° C., under conditions remote from saturation of the solvent. In the preferred form of embodiment, the working concentration corresponds to a value comprised between 20 and 40% by weight with respect to the saturation level of the solvent at this temperature.

Examples of inert organic solvents which may be used are pentane, hexane, cyclohexane, heptane, benzene, toluene and monochlorobenzene.

In view of the fact that the support is prepared under conditions which are completely reproducible, it is possible to prepare catalysts having strictly constant characteristics which produce polymers of likewise constant purity.

Furthermore, by appropriately selecting the starting compounds for the preparation of the sulphite and thus of the support, it is possible easily to vary the properties of the ployner, for example its molecular weight and distribution of molecular weight, without any need to modify the conditions of polymerisation and without any need to add additional reagent.

The invention will now be illustrated by the following examples which are not however intended to constitute any limitation on the scope of the present invention.

EXAMPLE 1

Into a 2-litre container, in which there is an inert atmosphere and slow agitation, are placed 1 litre of demineralised and de-aerated water and then 200 g. of finely powdered magnesium hydroxide. Gaseous sulphur dioxide is then bubbled through the resultant suspension until a clear solution is obtained with a pH of not more than 4; during this phase, the temperature is maintained constant at around ambient level. After separation of the solid impurities by filtration, the solution is ready for precipitation of the sulphite.

For this purpose, the sulphur dioxide is slowly eliminated by gradually lowering the pressure above the solution, which is slowly agitated, down to 30 mm. Hg, in 1 hour, and while the temperature is kept equal to approximately 20° C., the solution being subsequently kept still at 20° C. and 30 mm. Hg for a further hour.

The precipitate obtained is separated by filtration, washed in a suspension of acetone, in a quantity equal to approximately 30% by weight with respect to the acetone, and then dried in a crystalliser at a pressure of 250 mm. Hg and a temperature of 20° C. for 4 hours.

A treatment is then carried out to acitvate the magnesium sulphite hexahydrate obtained. For this purpose, the magnesium sulphite hexahydrate is placed in an electric oven fitted with a rotating device, where it is heated in a stream of nitrogen from ambient temperature up to 500° C. over a period of 4 hours, at which temperature it is maintained, still in a current of nitrogen, for a period of 15 hours.

A powdered product is obtained, nearly white in colour, which on analysis proves to be constituted by 47% by weight of magnesium, 42.35% of oxygen and 10.65% by weight of sulphur.

5 g. of this product are placed in a glass vessel fitted with a filtrating porous baffle and an agitator, containing 70 ml. of titanium tetrachloride of 1.726 g./cc. density. The whole is heated for 1 hour at 130° C. and the product obtained, after being washed with hot titanium tetrachloride, is subjected to a series of washings with small quantities of anhydrous industrial heptane.

After drying in a vacuum, a weakly coloured powder is obtained which contains 0.41% by weight of titanium and 7.7% by weight of chlorine.

Into a 2-litre stainless steel autoclave fitted with a heat exchange jacket, agitator, pressure gauge and thermometer sheath are placed 1 litre anhydrous industrial heptane, 150 mg. of powder prepared in the above-described manner and 600 mg. of aluminum triethyl.

Working at a temperature of 70° C., hydrogen is introduced into the autoclave until the pressure is 3.5 kg./sq. cm., followed by ethylene until the pressure is 13.5 kg./sq. cm., and these conditions are maintained for the next 2 hours by the continuous introduction of ethylene.

In this way, 186 g. powdered polyethylene are obtained with the following characteristic features: density: 0.962 g./cc.; melting index: 0.40 g./10 mins. at 190° C.; number of methyl groups to every 1000 carbon atoms=0.50; number of vinyl groups per 1000 carbon atoms not exceeding 0.08; number of vinylene groups per 1000 carbon atoms not exceeding 0.05; number of vinylidene groups per 1000 carbon atoms not exceeding 0.02 and melting point 132.7° C.

EXAMPLE 2

In an autoclave such as that described in Example 1 are placed 189 mg. of a powdered catalyst prepared as in Example 1 but containing 0.5% by weight of titanium and 6.3% by weight of chlorine, and 600 mg. of aluminium triethyl, together with 1 litre of anhydrous industrial heptane.

Working at a temperature of 70° C., 26 g. of propylene are introduced into the autoclave and subsequently the pressure is raised to 10.8 kg./sq. cm. by the introduction of ethylene.

These conditions are maintained for 1 hour, ethylene being supplied continuously.

In this way, 177 g. of copolymer are obtained containing 6.7% of propylene and having the following properties:

melting point=123-124° C.
density=0.938 g./cc.

EXAMPLE 3

In an autoclave such as that described in the previous Examples are introduced 192 mg. of powdered catalyst prepared as in Example 1, containing 0.48% titanium, 7.1% chlorine and 600 mg. of aluminum triethyl, together with 1 litre of anhydrous industrial heptane.

Working at a temperature of 70° C., 34.5 g. of 1-butene and subsequently ethylene are fed to the autoclave until the pressure is 11 kg./sq. cm.

These conditions are maintained for 1½ hours, ethylene being supplied continuously.

In this way, 158 g. of copolymer are obtained containing 4.05% by weight of 1-butene and having the following properties:

melting point=120-121° C.
density=0.940 g./cc.

What we claim is:

1. Process for the preparation of catalysts for the polymerisation of ethylene with alpha-olefins, consisting essentially of an organo-metallic compound selected from the group consisting of aluminum trialkyl, zinc dialkyl and aluminum dialkyl halide, where the alkyl groups comprise 1 to 4 carbon atoms, and the product of interaction between a liquid halogenated compound of a transition metal which is selected from the group consisting of chlorides, bromides and oxyhalides of the metals of groups IV-B and V-B of the Periodic Table and a solid granular support, characterised in that, at a temperature between 50 and 160° C. and in a period of not less than 30 minutes, a support obtained by activation of sulphites of calcium, magnesium, manganese or zinc at a temperature between 350 and 750° C. over a period of 3 to 25 hours in an inert atmosphere is impregnated with the liquid halogenated compound the transition metal and the resulting product is contacted with the organo-metallic compound, the solid support being between 5 and 25% by weight with respect to the liquid halogenated compound of the transition metal and the molar ratio of organo-metallic compound to fixed transition metal ranging from 20 to 100, the said sulphites having been produced essentially by:

solution or suspension in water of calcium, magnesium, manganese or zinc oxides, hydroxides or salts of organic or inorganic acids with a pK of first acid dissociation exceeding 1.8, in a quantity of at least 5% by weight;

bubbling through the resultant solution or suspension using sulphur dioxide in a quantity equal to or greater than and up to 50% in excess of that stoichiometrically necessary to transform the oxide, hydroxide or salt of calcium, magnesium, manganese or zinc into the form of an acid sulphite, at a temperature within the range from ambient temperature up to 60° C.;

slow elimination of the unreacted sulphur dioxide by a gradual lowering of the pressure above the solution or suspension to a pressure level corresponding to the vapour tension of the solution at the temperature at which the elimination is performed, over a period of not less than 1 hour and with the temperature maintained at the levels of the bubbling phase, under a slow agitation, so as to precipitate the hydrated sulphite of calcium, magnesium, manganese or zinc;

washing, with a polar organic solvent, and subsequent drying, at a temperature of approximately 20° C. and a pressure below atmospheric pressure, for a period of not less than 1 hour, of the precipitate obtained.

2. Process according to Claim 1, characterised in that impregnation of the solid support by the liquid halogenated compound of a transition metal is carried out over a period ranging from 30 minutes to 2 hours.

3. Process according to Claim 1, characterised in that a member selected from the group consisting of titanium trichloride and vanadium oxychloride is used as the halogenated derivative of the transition metal.

4. Process according to Claim 1, characterised in that the support is activated in the presence of an inert gas, the temperature being raised from ambient level to a level between 450 and 600° C. over a period of not less than 2 hours.

5. Process according to Claim 1, characterised in that the support is activated in the presence of an inert gas, the temperature being raised from ambient level to a level between 450 and 600° C. over a period ranging from 3 to 10 hours, the said temperature being maintained for a period of not less than 3 hours.

6. Process of Claim 5, characterised in that the said temperature between 450 and 600° C. is maintained for a period of 5 to 15 hours.

7. Process according to Claim 1, characterised in that activation of the support is carried out in the presence of nitrogen, argon or carbon dioxide.

8. Process according to Claim 1, characterised in that the sulphites are produced by solution or suspension in water of oxides, hydroxides or salts of calcium, magnesium manganese or zinc in quantity of between 10 and 20% by weight.

9. Process according to Claim 1, characterised in that elimination of the unreacted sulphur dioxide is carried out over a period of 1 to 3 hours.

10. Process according to Claim 1, characterised in that the metallo-organic compound is brought into contact with the product of interaction between the halogenated compound of the transition metal and the solid support in the presence of an inert hydrocarbon which must remain liquid under the conditions of polymerisation at a temperature of between 40 and 100° C.

11. Process according to Claim 10, characterised in that the inert hydrocarbon used is pentane, hexane, cyclohexane, heptane, benzene, toluene or monochlorobenzene.

References Cited

UNITED STATES PATENTS

| | | | |
|---|---|---|---|
| 3,047,551 | 7/1962 | Thomas | 252—429 C X |
| 3,166,542 | 1/1965 | Orzechowski et al. | 252—429 A X |
| 3,168,484 | 2/1965 | Engel et al. | 252—429 A |
| 3,454,547 | 7/1969 | Delbouille et al. | 252—429 C X |
| 3,535,299 | 10/1970 | Dassesse et al. | 252—429 C X |

PATRICK P. GARVIN, Primary Examiner

U.S. Cl. X.R.

260—94.9 B